(12) United States Patent
Harwood et al.

(10) Patent No.: US 11,103,944 B2
(45) Date of Patent: Aug. 31, 2021

(54) SELF-SHARPENING CUTTING TOOTH FOR A FELLING APPARATUS

(71) Applicant: Deere & Company, Moline, IL (US)

(72) Inventors: Adam G. Harwood, Dubuque, IA (US); Russell R. Reeg, Dubuque, IA (US)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 16/538,261

(22) Filed: Aug. 12, 2019

(65) Prior Publication Data

US 2021/0046564 A1 Feb. 18, 2021

(51) Int. Cl.
| | |
|---|---|
| *B23D 61/06* | (2006.01) |
| *B23D 61/02* | (2006.01) |
| *A01G 23/091* | (2006.01) |

(52) U.S. Cl.
CPC ......... *B23D 61/065* (2013.01); *B23D 61/028* (2013.01); *A01G 23/091* (2013.01)

(58) Field of Classification Search
CPC .... B23D 61/04; B23D 61/14; B23C 2210/32; B23C 5/20; B23C 5/08; B23C 2210/16; B23C 2200/161; B23C 5/2221; B23C 5/2204; B23B 27/1622; B23B 2200/161; B23B 2205/12; B23B 27/08; B23B 27/04; C23C 14/064; Y10T 83/9317; Y10T 83/9329; Y10T 83/9319; Y10T 407/1944; Y10T 428/26; Y10T 407/27
USPC ............... 83/835, 839, 661; 407/52, 30, 113
See application file for complete search history.

(56) References Cited

U.S. PATENT DOCUMENTS

| | | | |
|---|---|---|---|
| 3,308,859 A | 3/1967 | Ehlen | |
| 4,690,024 A | 9/1987 | Chaconas | |
| 4,842,937 A * | 6/1989 | Meyer .................. | C23C 16/029 |
| | | | 428/408 |
| 5,027,878 A | 7/1991 | Revankar et al. | |
| 5,267,600 A | 12/1993 | Revankar | |
| 5,288,353 A | 2/1994 | Revankar | |
| 5,299,620 A | 4/1994 | Revankar et al. | |
| 5,644,965 A | 7/1997 | MacLennan et al. | |
| 5,879,743 A | 3/1999 | Revankar | |
| 7,163,754 B2 | 1/2007 | Revankar et al. | |
| 8,061,396 B2 | 11/2011 | MacLennan et al. | |
| 9,687,997 B2 | 6/2017 | Micacchi | |
| D812,115 S | 3/2018 | MacLennan et al. | |
| 10,272,508 B2 | 4/2019 | MacLennan | |
| 2003/0168912 A1 | 9/2003 | Wodrich et al. | |
| 2004/0244560 A1 | 12/2004 | Krehel | |

(Continued)

FOREIGN PATENT DOCUMENTS

CA  2236657 A1  11/1999

*Primary Examiner* — Ghassem Alie
(74) *Attorney, Agent, or Firm* — Patterson Intellectual Property Law, PC; Ryan D. Levy

(57) ABSTRACT

A cutting tooth includes a tooth body having a mounting side, a front face spaced from the mounting side, and a plurality of lateral faces extending between the mounting side and the front face, the tooth body having an interior hardness, and a coating applied to at least one of the lateral faces to form a lateral hardface, the lateral hardface having a hardface hardness greater than the interior hardness, an edge of the lateral hardface closest to the front face and a portion of the front face adjacent the edge of the lateral hardface defining a cutting edge region of the tooth.

13 Claims, 9 Drawing Sheets

(56) References Cited

U.S. PATENT DOCUMENTS

| | | |
|---|---|---|
| 2005/0064095 A1 | 3/2005 | Revankar |
| 2006/0225553 A1* | 10/2006 | Hasegawa ............... C22C 29/08 |
| | | 83/835 |
| 2007/0151430 A1 | 7/2007 | MacLennan et al. |
| 2008/0233296 A1 | 9/2008 | Revankar |
| 2010/0011934 A1 | 1/2010 | Micacchi |
| 2014/0271000 A1* | 9/2014 | Sakamoto ............. C23C 28/044 |
| | | 407/119 |
| 2014/0377021 A1* | 12/2014 | Knebel .................. B23D 61/04 |
| | | 407/52 |
| 2015/0030401 A1* | 1/2015 | Senbokuya ............. B23B 51/00 |
| | | 407/119 |
| 2017/0252837 A1* | 9/2017 | Ootaka ................... B23B 27/16 |
| 2018/0029144 A1* | 2/2018 | Ono .................. C23C 16/45587 |
| 2019/0059248 A1 | 2/2019 | Agrawal et al. |
| 2020/0122248 A1* | 4/2020 | Nozaki ................... B23B 27/14 |

\* cited by examiner

SELF-SHARPENING CUTTING TOOTH FOR A FELLING APPARATUS

FIELD OF THE DISCLOSURE

The present disclosure relates to cutting teeth used for a felling apparatus having a circular saw. More particularly, the present disclosure relates to self-sharpening saw teeth for a felling apparatus.

BACKGROUND

Forestry machinery such as felling apparatuses are used to harvest trees and other vegetation. Felling apparatuses include feller bunchers having cutting implements, often circular saws.

In use, the teeth of the circular saw of a felling apparatus wear quickly and are designed most often to be removable from the circular saw of the felling apparatus. This is because each individual tooth becomes dull or rounded at its exposed cutting region from use, which may result in both a decrease in productivity as well as poor cut quality. In some instances, dull cutting teeth can result in the saw blade binding or stalling within the cut, causing a poorly cut surface, damage to the tree fibers, and undesirable bending load on the saw blade. When the saw blade binds within the cut, an operator may have to forcefully remove the saw blade from the tree and then reenergize the saw blade. Subsequently the operator would have to carefully position the saw blade back into the kerf of the previous cut to complete the cut or otherwise waste a portion of the tree with a new cut.

Thus, human operators periodically change each individual cutting tooth, or alternatively rotate each cutting tooth if the specific cutting tooth has additional cutting regions not yet dulled. Changing or rotating each cutting tooth of a saw of a felling apparatus requires significant down time, as the felling apparatus must not be in operation for the saw teeth to be changed or rotated.

Furthermore, cutting teeth of saw blades occasionally impact hard surfaces such as rock formations. Durable teeth which are not only replaceable, but also exhibit good wear performance and high impact strength are desirable for felling applications. Current carbide insert cutting teeth may provide increased wear performance but may have poor impact strength. Conversely, current hardened steel cutting teeth may provide better impact strength but may have less wear performance.

SUMMARY OF THE DISCLOSURE

The current disclosure provides improvements in saw teeth for circular saws of felling apparatuses.

In one embodiment, a cutting tooth includes a tooth body with a mounting side, a front face spaced from the mounting side, and a plurality of lateral faces extending between the mounting side and the front face. The tooth body also includes an interior hardness as well as a coating applied to at least one of the lateral faces to form a lateral hardface of the cutting tooth. The lateral hardface has a hardness greater than the interior hardness with an edge at the lateral hardface closest to the front face defining a cutting edge region of the cutting tooth with the portion of the front face adjacent to the edge of the lateral hardface.

In another embodiment, a cutting tooth includes a hardened tooth body having an interior hardness and having a hardened outer body layer with an outer body layer hardness greater than the interior hardness. The tooth body may also include a mounting side, a front face space from the mounting side, and a plurality of lateral faces extending between the mounting side and the front face with a hardface formed on at least one of the lateral faces. Such cutting tooth may have a hardface hardness greater than the outer body layer hardness.

Numerous objects, features and advantages of the embodiments set forth herein will be readily apparent to those skilled in the art upon reading of the following disclosure when taken in conjunction with the accompanying drawings.

DETAILED DESCRIPTION

Figure 2A:
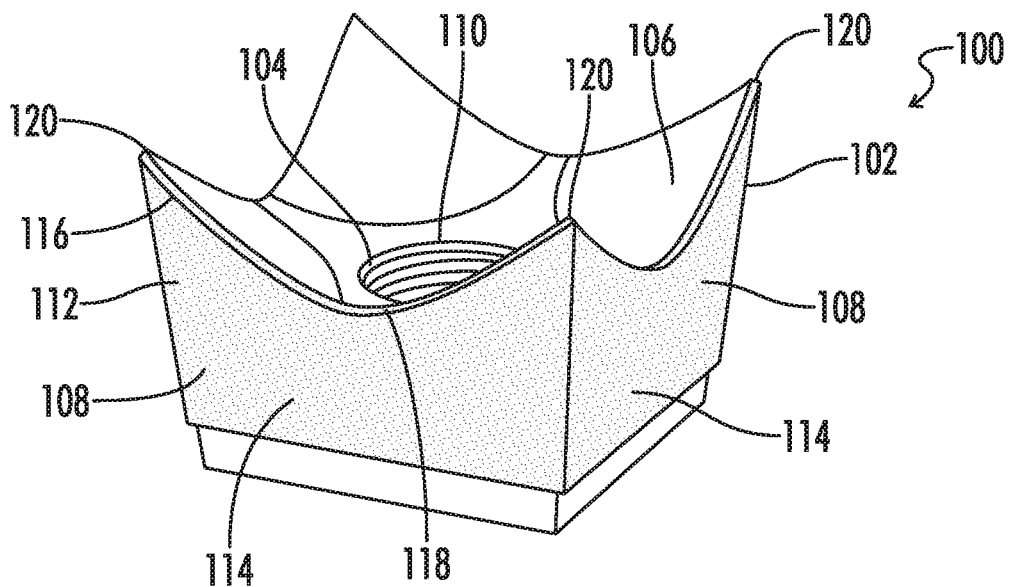
FIG. 2A is a side perspective view illustration of an additional embodiment of a cutting tooth having self-sharpening features with a mounting hole.
Figure 2B:
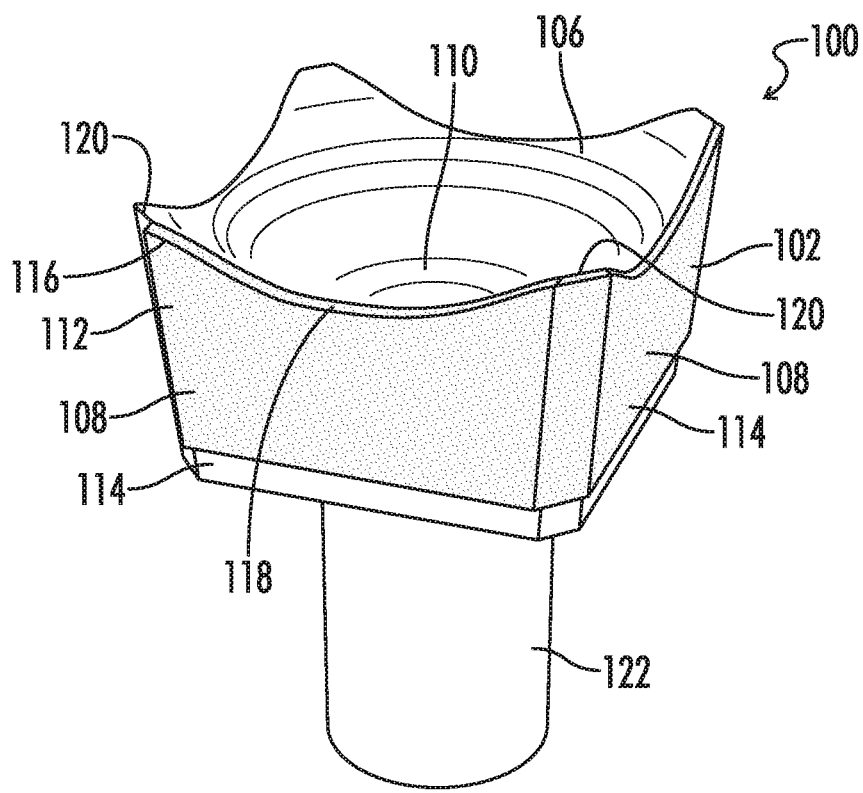
FIG. 2B is a side perspective view illustration of an additional embodiment of a cutting tooth having self-sharpening features with a shank.
Figure 3:
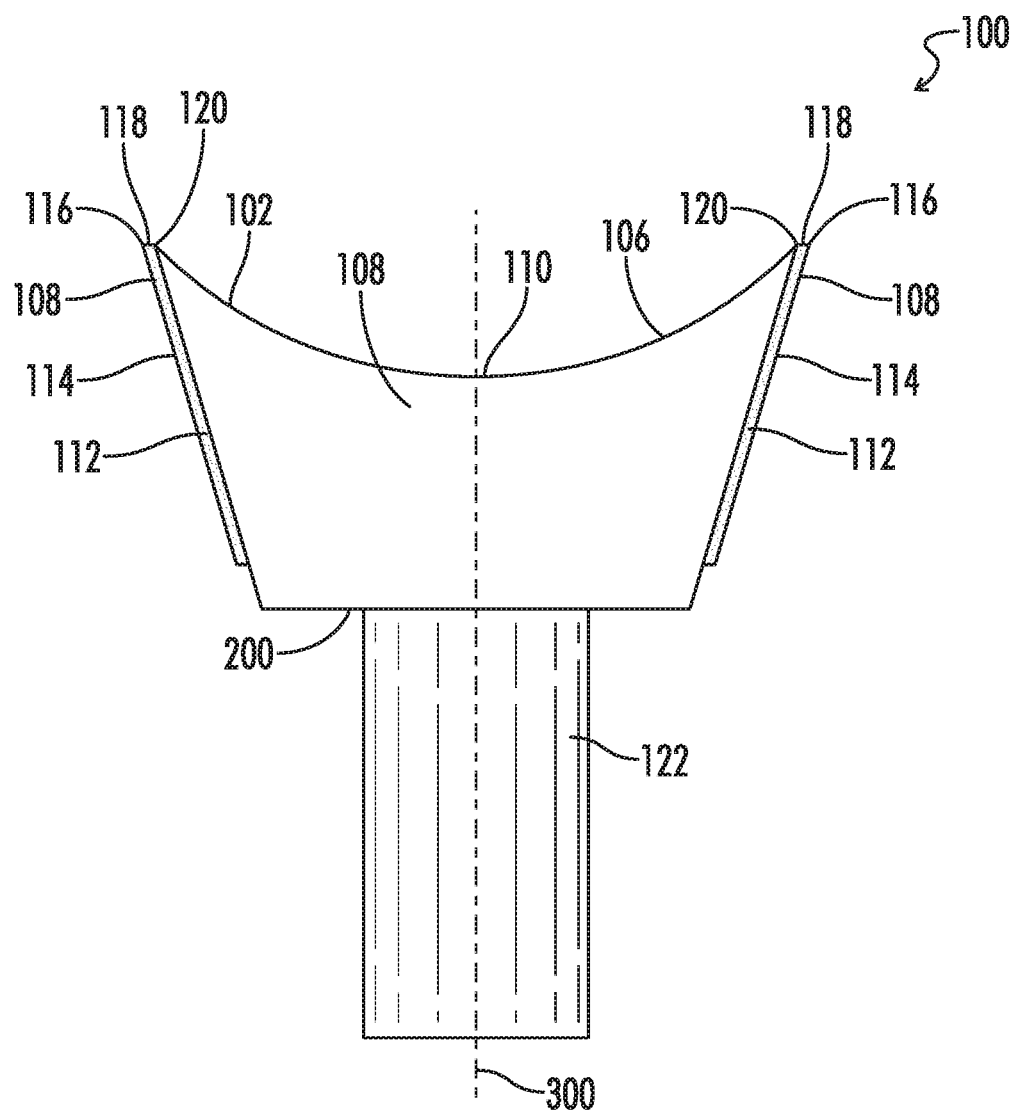
FIG. 3 is a side view illustration of a cutting tooth having two self-sharpening cutting regions.

Referring now to the drawings and particularly to FIGS. 1-3, a cutting tooth is shown and generally designated by the numeral 100. FIGS. 1-3 illustrate a cutting tooth 100 with a tooth body 102 having a mounting side 200, a front face 106, and a plurality of lateral faces 108. The front face 106 is spaced apart from the mounting side 200 with the plurality of lateral faces 108 extending between the mounting side 200 and the front face 106. The cutting tooth 100 is applicable to feller apparatuses, also understood to be feller buncher machines which are generally used to quickly saw through trees and/or brush. These machines generally include a felling head with a circular saw having a plurality of cutting teeth mounted to the cutting saw. The cutting tooth 100 may also be used on other cutting apparatuses such as, for example, brush mulchers.

Figure 1A:
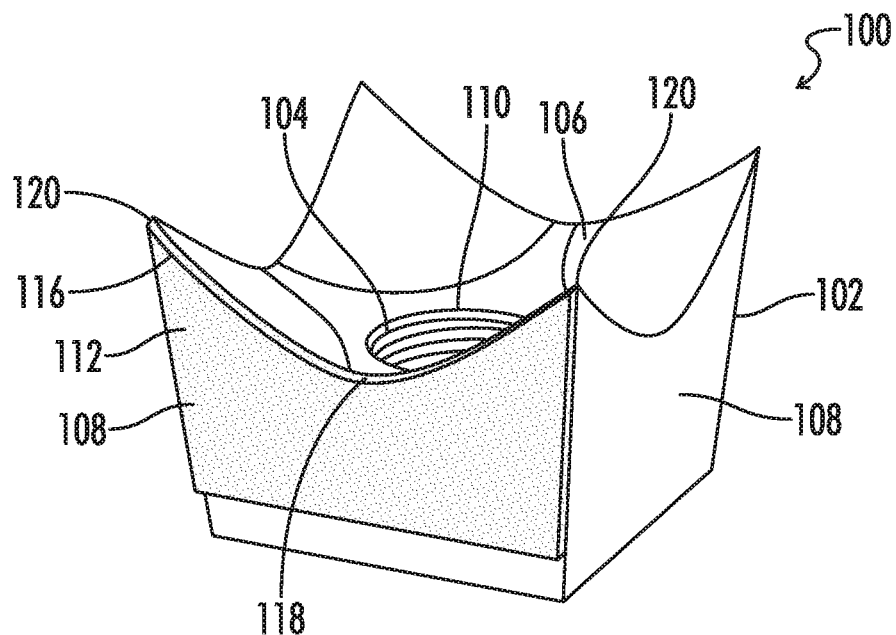
FIG. 1A is a side perspective view illustration of a cutting tooth having self-sharpening features with a mounting hole.
Figure 1B:
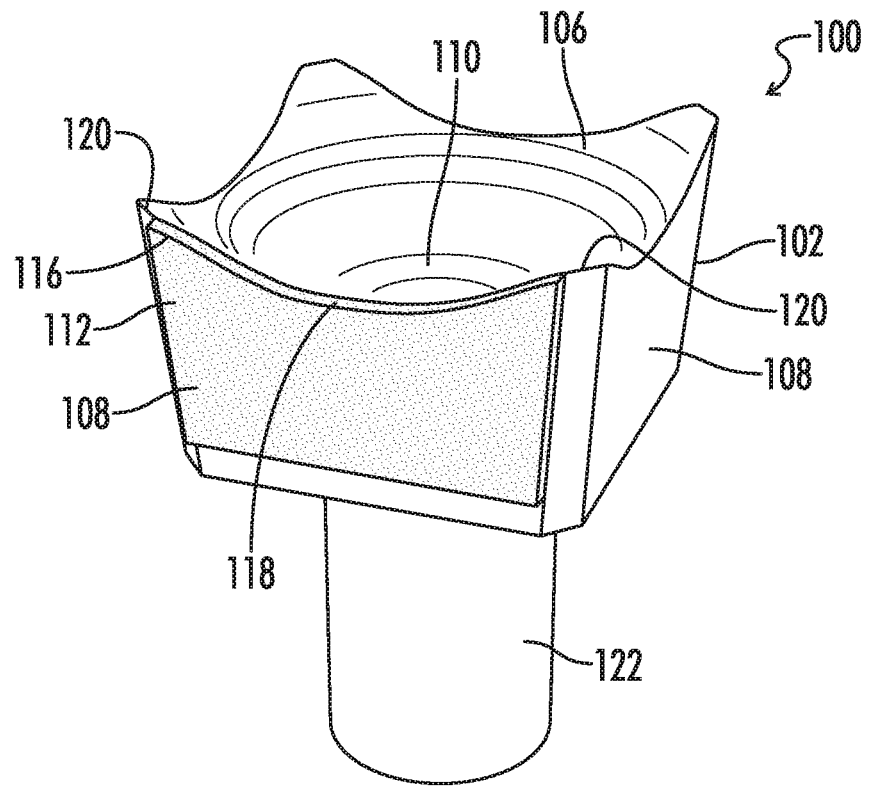
FIG. 1B is a side perspective view illustration of a cutting tooth having self-sharpening features with a shank.

The front face 106 of the cutting tooth 100 is generally understood to be the face of the cutting tooth 100 that faces the cutting direction when mounted to a circular saw for a felling apparatus. The mounting side 200 is generally understood to be the side of the cutting tooth 100 which mounts against a circular saw of a felling apparatus. As illustrated in FIGS. 1A and 2A, the cutting tooth 100 may include the mounting hole 104 whereby the cutting tooth 100 may be mounted to a circular saw of a felling apparatus via a bolt or similar hardware. As illustrated in FIGS. 1B and 2B, the cutting tooth 100 may include a shank 122 for mounting rather than a mounting hole extending through the front face.

The lateral faces 108 of the cutting tooth 100 are generally understood to be on the sides of the cutting tooth 100 and in some embodiments span between mounting side 200 and front face 106. One or more of the lateral faces 108 may include a coating 112 to form a lateral hardface 114. The lateral hardface 114 may include an edge 116 which with the adjacent portion of the front face 106 defines the cutting edge region 118 of the cutting tooth 100. As used herein, the edge 116 of the lateral hardface 114 is generally understood to be the portion of the lateral hardface 114 near the front face 106 and which contacts the material desired to be cut when in use with a circular saw of a felling apparatus. The cutting edge region 118 of one lateral face 108 of cutting tooth 100 extends between tips 120 and as illustrated may have a generally "U" shaped appearance. In further optional embodiments, the cutting edge region may have more of a "V" shaped appearance or alternatively other shapes depending on the specific geometry of the cutting tooth. In other embodiments, the cutting edge region could be a generally straight line.

Coating 112 may be applied to one or more of the lateral faces 108 in forming lateral hardfaces 114. As illustrated in FIGS. 1A and 1B, the coating 112 is on a significant portion of one of the lateral faces 108 to form a lateral hardface 114. FIG. 2 illustrates an additional embodiment where the coating 112 is applied to multiple lateral faces 108 to create two lateral hardfaces 114. As illustrated in FIGS. 2A and 2B, the lateral hardfaces 114 may be adjacent to one another rather than opposite each other.

FIG. 3 is an illustration of a side view of a cutting tooth 100 with two lateral hardfaces 114, the two hardfaces on generally opposite sides of the tooth body 102. In use, if one of the lateral hardfaces 114 of the cutting tooth 100 in FIG. 3 becomes too worn, the cutting tooth 100 may be removed and rotated about 180° about central axis 300 of cutting tooth 100 and then remounted on the cutting implement.

Additionally, as illustrated in FIG. 3, the front face 106 is concave with at least one of the lateral faces 108 extending forward beyond the central portion 110 of the front face 106. Additionally, where the coating 112 is part of the lateral face 108 to form a lateral hardface 114, the lateral hardface 114 also extends beyond the central portion 110 of the front face 106. As used herein, the term "concave" is understood to mean that the front face of the cutting tooth curves or orients inward towards the tooth body 102 of cutting tooth 100. In some embodiments, the central portion 110 of the front face 106 is understood to be the most inward area of the front face 106. The central axis 300 is the axis spanning from the mounting side 200 to the front face 106 through the central portion 110 about which cutting tooth 100 may be rotated so that a different cutting edge region 118 may be positioned on the cutting implement to cut when a different cutting edge region 118 on the cutting tooth 100 is worn. In further reference to central axis 300, in some embodiments the lateral hardface 114 extends in a direction no greater than 30° offset from the central axis 300. In some embodiments, the lateral hardface extends in a direction no greater than 30° offset from the cutting direction.

Figure 4:
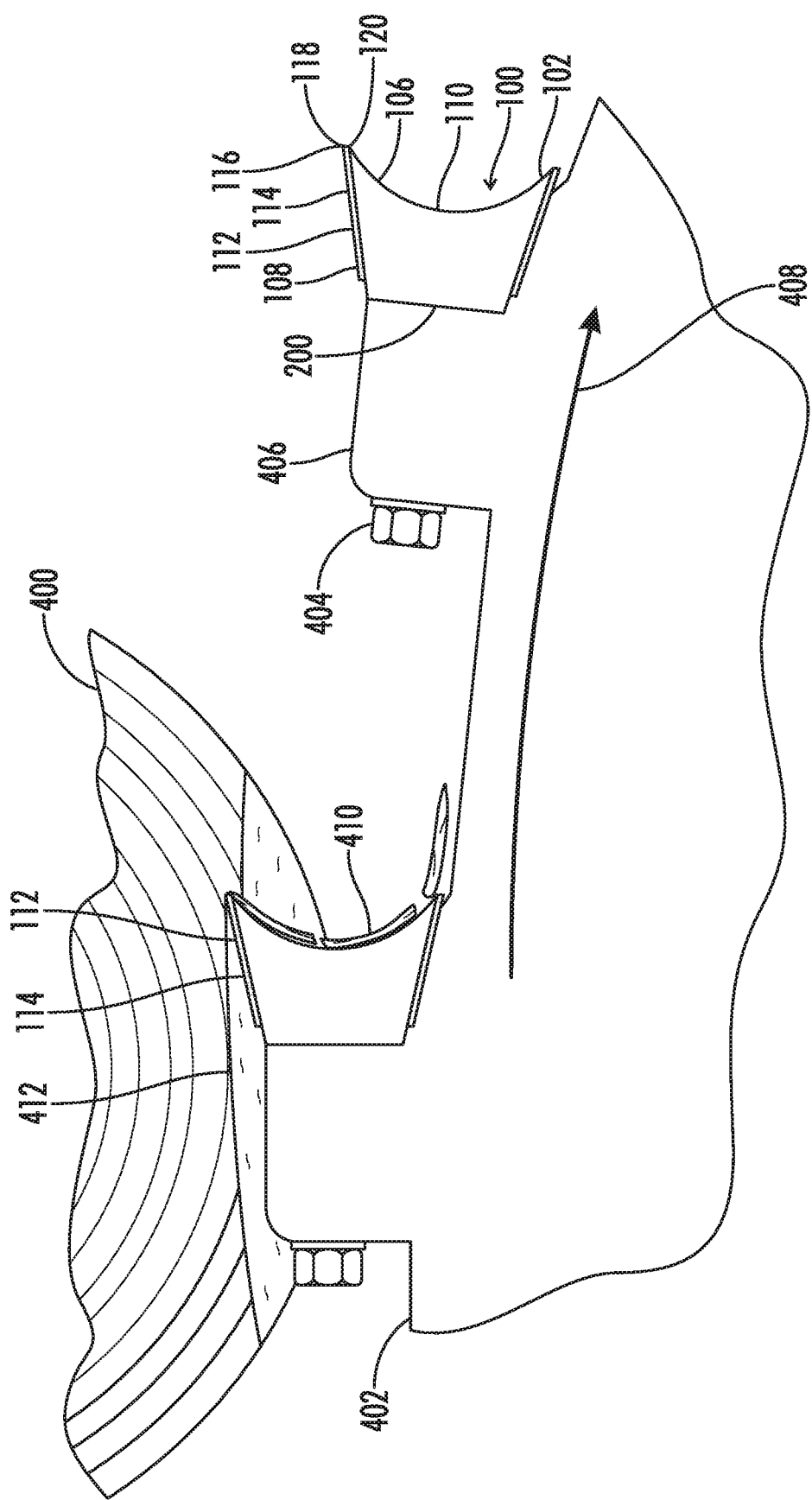
FIG. 4 is a top view illustration of a coated cutting tooth on a circular saw of a felling apparatus engaging a tree.

Referring now to FIG. 4, there is a top view illustration of a cutting implement 402 engaging the cutting material 400 with a cutting tooth 100 having a lateral hardface 114. Additionally illustrated, is a cutting tooth 100 having a lateral hardface 114 out of engagement with the cutting material 400. In some embodiments, the cutting implement 402 may be a circular saw that rotates in the circular direction indicated by the arrow labeled with the numeral 408. The cutting material 400 may be a tree and include cut portion 412 whereby the cutting tooth 100 with coating 112 and lateral hardface 114 has already removed cuttings 410.

The edge 116 of the lateral hardface 114 of the cutting tooth 100 at cutting edge region 118 engages the cutting material 400 while the cutting implement 402 rotates in the circular direction 408.

Generally, the cutting teeth 100 are mounted to the cutting implement 402 at mount locations 406 and may be affixed via mounting hardware 404. When the cutting edge regions 118 of the cutting teeth 100 become too worn from engaging cutting material 400, the mounting hardware 404 may be removed and the cutting teeth 100 may be remounted so that the opposite lateral hardfaces 114 and the unworn cutting edge region 118 may be positioned to engage the cutting material 400.

Figure 5A:
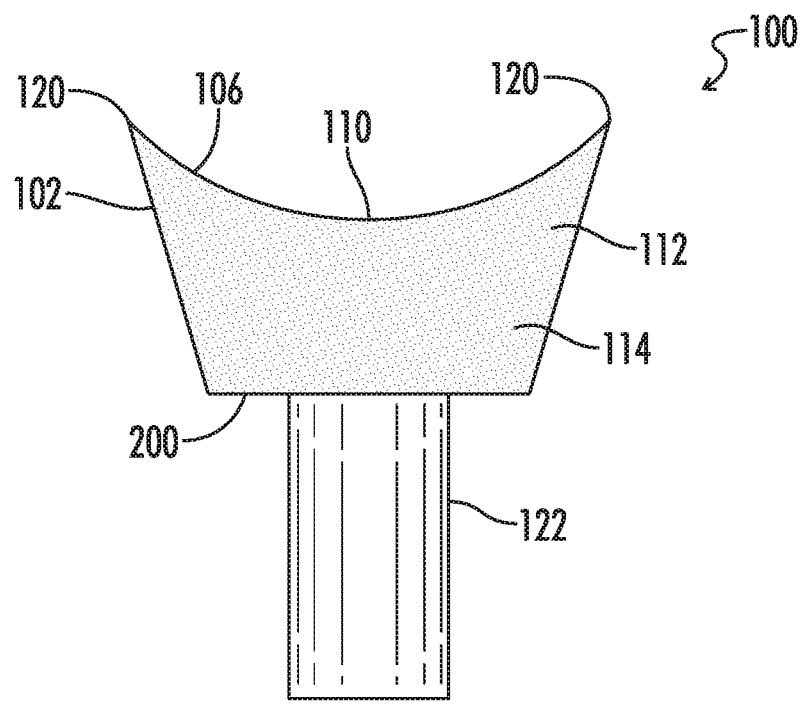
FIG. 5A is a side view illustration of an embodiment of a cutting tooth having a full coating on the lateral face.
Figure 5B:
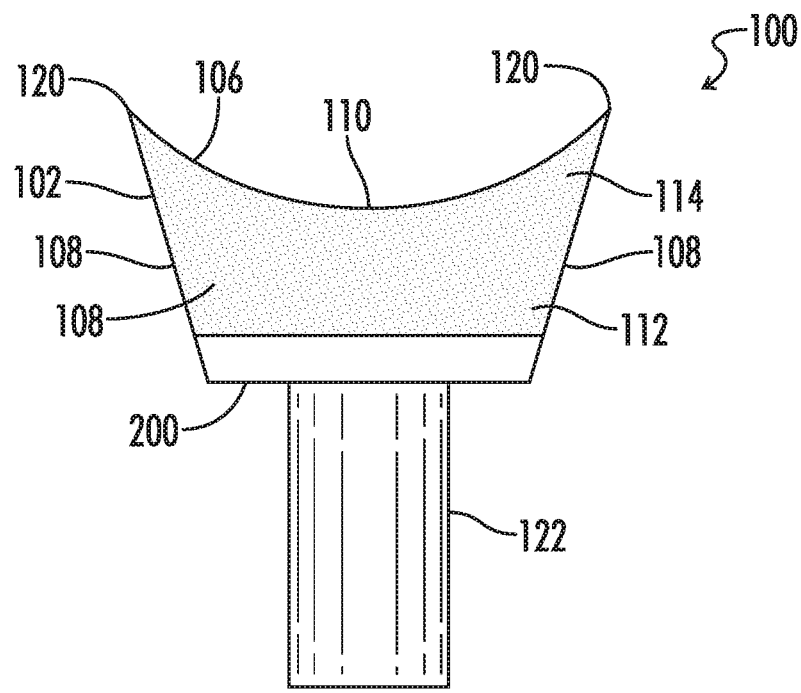
FIG. 5B is a side view illustration of an additional embodiment of a cutting tooth having a partial coating on a lateral face.
Figure 5C:
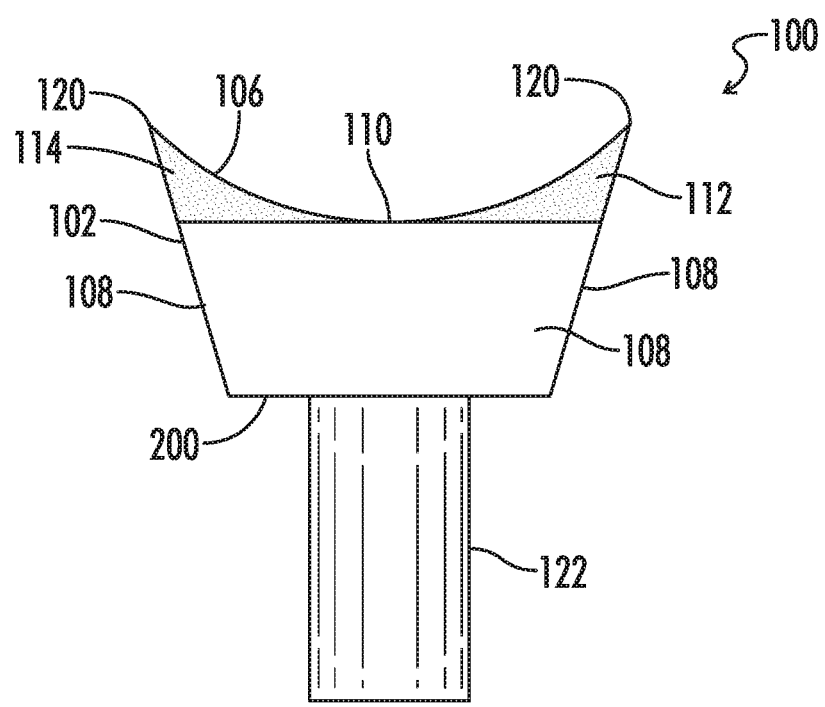
FIG. 5C is a side view illustration of an additional embodiment of a cutting tooth having a partial coating on the lateral face.

Referring now to FIGS. 5A-5C, there are multiple side view illustrations of different embodiments of cutting tooth 100. FIG. 5A illustrates cutting tooth 100 having the coating 112 on the entire lateral face 108 to create the lateral hardface 114. FIG. 5B illustrates coating 112 on a substantial portion of lateral face 108 to create a partial lateral hardface 114. FIG. 5C illustrates the coating 112 applied to the lateral face 108 to just below the central portion 110 of front face 106 of the cutting tooth 100. Various coverage by the coating 112 on the lateral faces 108 provide for differing surface areas of lateral hardfaces 114 which may be useful for different applications. As such, optional embodiments of cutting teeth 100 include various arrangements of lateral hardfaces 114 which is generally controlled by the application of coating 112 to the lateral faces 108 of the cutting tooth 100.

Figure 6:
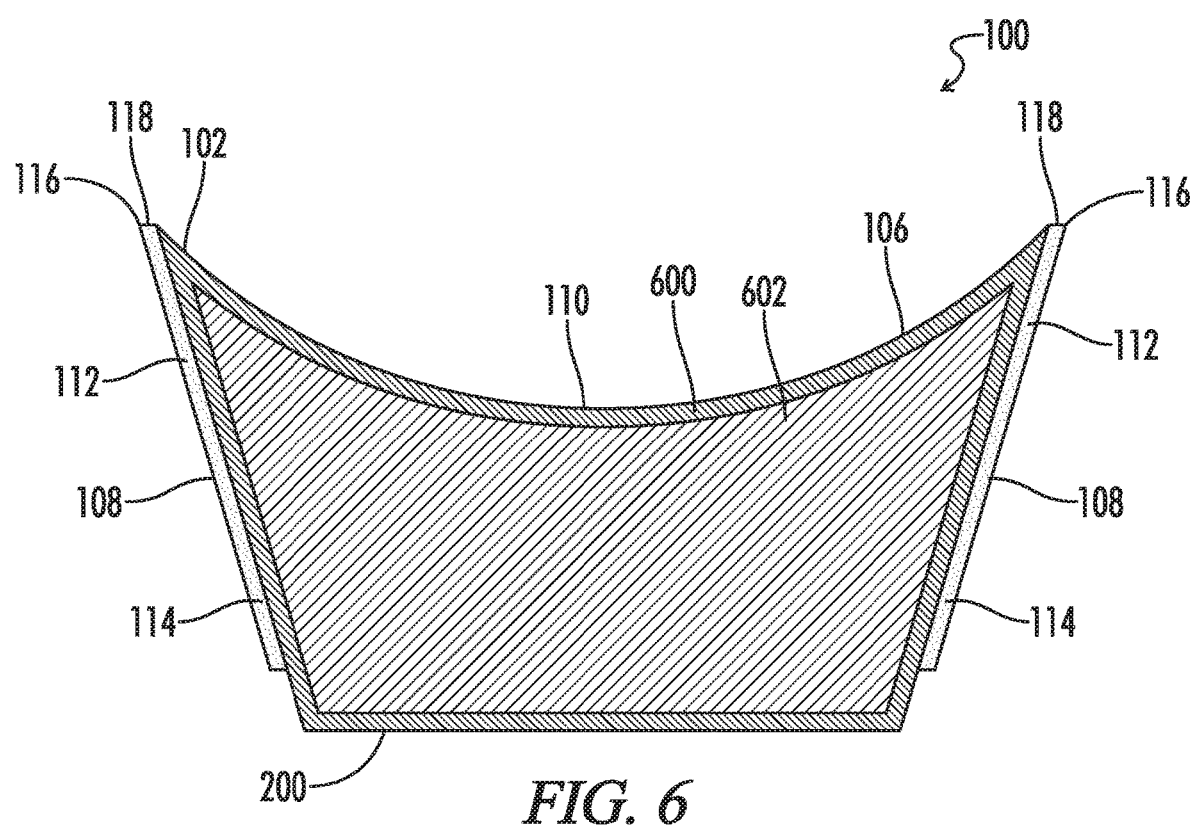
FIG. 6 is a cross-sectional view illustration of a cutting tooth with a coating on two lateral faces with the cross section illustrating the outer body layer and the interior of the cutting tooth.

Hardness Transition as Illustrated by FIG. 6

The coating 112 as applied to one or more lateral faces 108 to create lateral hardfaces 114 of a cutting tooth 100 advantageously provides an increased hardness at the cutting edge region 118. FIG. 6 is a cross-section side view illustration of a cutting tooth 100 through both lateral hardfaces 114. In addition to the various aspects of the cutting tooth 100 as illustrated in FIG. 3, FIG. 6 further illustrates hardened outer body layer 600 and tooth interior 602. Generally, the coating 112 which creates the lateral hardface 114 provides an increased hardness over a cutting tooth not having such coating. In some embodiments, coating 112 provides a Rockwell C hardness of 65 or greater at the surface of the lateral hardface 114. Otherwise stated, coating 112 can have a Rockwell C hardness of 65 or greater which provides the lateral hardface 114 with a hardface hardness greater than the rest of the tooth body 102. In some embodiments, coating 112 provides a Rockwell C hardness of 70 or greater at the surface of the lateral hardface 114. Hardened outer body layer 600 of the tooth body 102 may have a Rockwell C hardness in a range of from about 58 to about 64.

Hardened outer body layer 600 of tooth body 102 of cutting tooth 100 may be created in a variety of manners. For example, hardened outer body layer 600 may be the result of tooth body 102 having a carburized surface or case hardened. As a result, hardened outer body layer 600 may have a hardness in a range of from about 58 to about 64 Rockwell C and optionally a hardness in a range of from about 60 to about 62 Rockwell C.

Tooth body 102 of cutting tooth 100 also includes interior 602. Interior 602 is understood to be the interior portion of tooth body 102 of cutting tooth 100 and has an interior hardness in a range of from about 25 to about 35 Rockwell C. In certain embodiments, the hardness of interior 602 may be lessor or greater though the interior hardness is less than that of coating 112 of cutting tooth 100. Thus, cutting tooth 100 may include interior 602 with an interior hardness in a range of from about 25 to about 35 Rockwell C; a hardened outer body layer 600 with an outer body layer hardness in a range of from about 58 to about 64 Rockwell C, and a lateral hardface 114 with a hardface hardness of at least 65 Rockwell C. In some embodiments of cutting tooth 100, at least a portion of the outer surface of tooth body 102 is hardened to form hardened outer body layer 600 having an outer body layer hardness greater than the interior hardness and less than the hardface hardness. Furthermore, in some embodiments only a portion of the surface of the tooth body 102 of cutting tooth 100 may be hardened.

In use, cutting tooth 100 may be positioned wherein front face 106 includes hardened outer body layer 600 so that in an unworn state of cutting tooth 100 (as illustrated in FIG. 6), cutting edge region 118 of cutting tooth 100 presents in a cutting direction, edge 116 of lateral hardface 114 adjacent the hardened outer body layer 600 of front face 106. In some embodiments, cutting edge region 118 of cutting tooth 100 includes edge 116 of lateral hardface 114 with a portion of hardened outer body layer 600 of front face 106.

Thus, one can otherwise describe FIG. 6 as illustrating a cutting tooth 100 that includes tooth body 102 with lateral hardface 114 such that a cross section of cutting tooth 100 through the lateral hardface 114 transitions from the hardness of the hardened outer body layer 600 to the hardness of interior 602.

The Self-Sharpening Feature of the Cutting Tooth

Figure 7A:
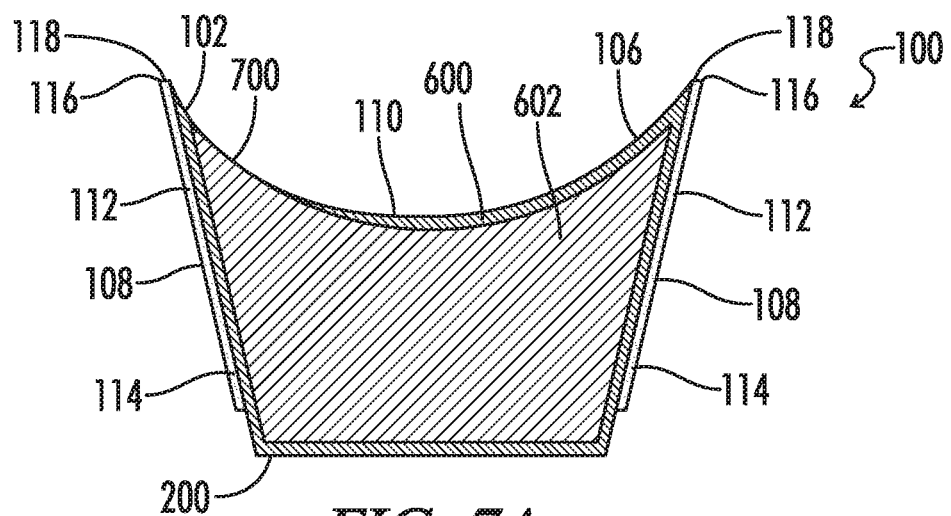
FIG. 7A is a cross-sectional view illustration of the cutting tooth as illustrated in FIG. 5 but in a partially worn state.
Figure 7B:
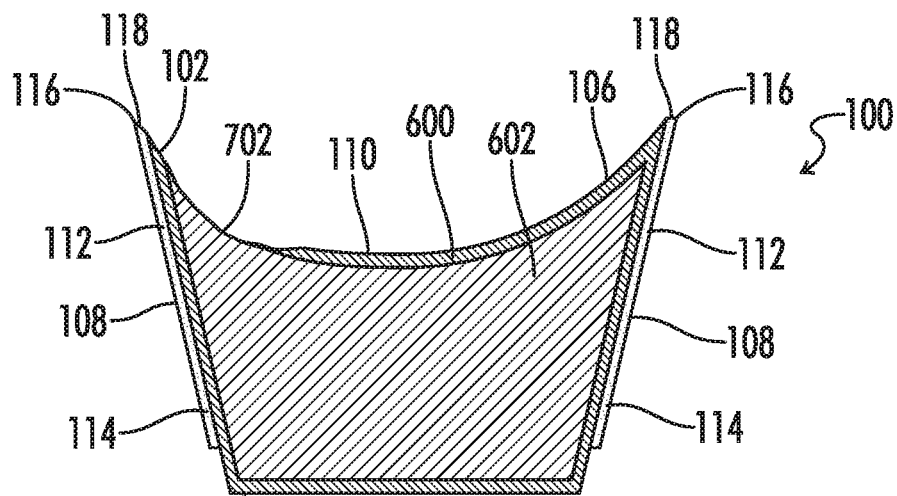
FIG. 7B is a cross-sectional view illustration of the cutting tooth as illustrated in FIG. 7A but in a further worn state.
Figure 7C:
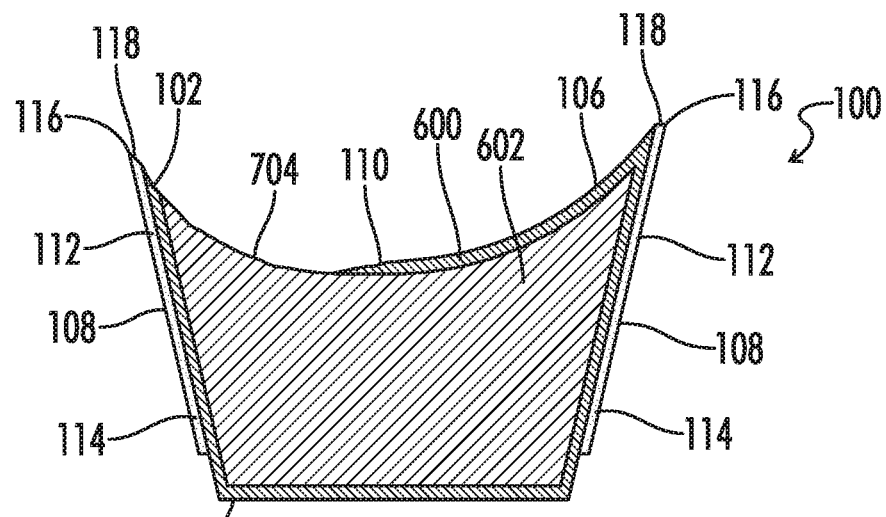
FIG. 7C is a cross-sectional view illustration of the cutting tooth as illustrated in FIG. 7B but in a further worn state.

The transition of an increased hardness at lateral hardface 114 to the hardened outer body layer 600 to the interior 602 of tooth body 102 provides a cutting tooth 100 with a self-sharpening characteristic. As cutting tooth 100 wears from use, the wear pattern of cutting tooth 100 is such that cutting edge region 118 remains sharp and able to cut through the cutting materials. FIG. 6 illustrated a cross-sectional view of a cutting tooth 100 with two lateral hardfaces 114 in an unworn state. FIGS. 7A-C illustrate cutting teeth 100 with successively increasing wear patterns.

Referring now to FIG. 7A there is a schematic cross-sectional illustration of cutting tooth 100 having initial wear pattern 700. Thus, after use hardened outer body layer 600 of front face 106 adjacent cutting edge region 118 is worn away as illustrated by wear pattern 700. Whereas lateral hardface 114 continues to remain and wears at a slower rate due to the increased hardness of lateral hardface 114 in comparison to the hardness of hardened outer body layer 600.

Now referring to FIG. 7B, wear pattern 702 of cutting tooth 100 illustrates greater wear than wear pattern 700 of FIG. 7A. Thus, wear pattern 702 illustrates further wearing of hardened outer body layer 600 and additionally wearing of interior 602 of cutting tooth 100. Cutting edge region 118 has experienced slight wear as has lateral hardface 114 but not as significantly as interior 602 and hardened outer body layer 600 of front face 106.

Referring now to FIG. 7C, wear pattern 704 illustrates significantly more wear of hardened outer body layer 600 from front face 106 as well as further wear of interior 602 of cutting tooth 100. Additionally, lateral hardface 114 has been slightly more worn in comparison to FIG. 7B though continues to wear at a lessor rate than interior 602 and hardened outer body layer 600 of front face 106.

In comparing the unworn cross section as illustrated in FIG. 6 to the increasing wear patterns of FIGS. 7A-C, cutting edge region 118 remains relatively sharp rather than dulling or rounding. This is due to the increased hardness of lateral hardface 114 in comparison to the hardened outer body layer 600 and tooth interior 602. Thus, cutting edge region 118 of cutting tooth 100 is self-sharpening during because of the faster wear of front face 106 and interior 602 than of lateral hardface 114. In the worn states as illustrated in FIGS. 7A-C hardened outer body layer 600 of front face 106 is worn away so that cutting edge region 118 presents in the cutting direction edge 116 of lateral hardface 114 adjacent the worn regions of front face 106.

Embodiments of the Coating for the Lateral Hardface

Referring now to FIGS. 1-7C, coating 112 may be applied to one or more lateral faces 108 of the tooth body 102 of the cutting tooth 100 in differing thicknesses. Generally, the thickness of coating 112 controls the thickness of cutting edge region 118. In some embodiments, coating 112 may have a thickness in a range from about 0.25 mm to about 3 mm. In some embodiments, coating 112 may have a thickness in a range from about 1 mm to about 3 mm.

In some embodiments, coating 112 may be a fused alloy that is substantially harder and more wear-resistant than the material used for the tooth body 102. For example, coating 112 may be harder than 1045 grade steel even in a hardened conditioned. In some embodiments, the coating 112 may be metallurgically bonded to the tooth body 102. In some embodiments, the coating 112 may be applied to a portion of tooth body without the hardened outer body layer 600.

Commonly owned U.S. Pat. No. 5,879,743, the entire contents of which are incorporated herein by reference, discloses an alloy which may be used as the coating 112. The coating 112 in some embodiments may be at least 60% of a transition metal of Group VIII of the Periodic Table, such as iron, cobalt, or nickel. However, the coating 112 may be based on other metals in other embodiments. Minor components, about 0.1 to about 20 wt. % of the coating 112, typically are boron, carbon, chromium, iron (in nickel and cobalt-based alloys), manganese, nickel (in iron and cobalt-based alloys), silicon, tungsten, molybdenum, one or more carbide forming elements, or combinations thereof. Elements in trace amounts, less than about 0.1 wt. % of the coating 112, such as sulfur, may be present as de minimis, contaminants. The coating 112 has a fusion temperature which is lower than the melting point of cutting tooth 100, in some embodiments, about 1110° C. or less, and optionally between about 900° C. and about 1200° C. Generally, the coating may include an iron-based alloy including at least 60 weight percent of iron, cobalt, or nickel. In some embodiments, the coating 112 may include one or more elements selected from iron, nickel, and cobalt, and two or more elements selected from boron, carbon, chromium, molybdenum, manganese, tungsten, and silicon.

Coating 112 may be applied as slurry and can be formed from polyvinyl alcohol (PVA) and a fusible, hard metal alloy in the form of a finely divided powder. Typical particle sizes range from about 90 mesh to about 400 mesh. The average particle size may be finer than about 115 mesh and in some embodiments may be finer than about 200 mesh. The powder can be a mixture of powders of different particle sizes. The slurry for forming coating 112 may be spray coated, spun cast, dipped, poured, or spread on tooth body 102.

In some embodiments, the coating 112 of cutting tooth 100 may be formed from a substantially uniform aqueous slurry of polyvinyl alcohol and a fusible, hard metal alloy in the form of a finely divided powder is formed and coated on the tooth body 102. The aqueous slurry may then be dried to leave a solid layer of fusible, hard metal alloy in a polyvinyl alcohol matrix on the tooth body 102. Such steps in some embodiments may be repeated one or more times to build up a thicker coating. Additionally, the thickness of an unfused slurry for the coating 112 can be adjusted by a shrinkage factor to result in a desired thickness of the coating 112 on the tooth body 102 after metallurgical bonding.

In some embodiments, the coating 112 of cutting tooth 100 may be formed from an aqueous polyvinyl alcohol solution and a substantially uniform layer of a fusible, hard metal alloy in the form of a finely divided powder is distributed onto the coating of the polyvinyl alcohol solution before the polyvinyl alcohol solution dries. The steps of coating the metal surface, distributing the fusible hard metal alloy, and drying the slurry or the solution coating to leave a solid layer may be repeated one or more times to result the coating 112 being thicker.

Dipping, pouring, brushing, paste and tape methods, and repeated spraying are techniques which may be used for creating a thicker coating 112. In some embodiments, the ratio of hard metal alloy to PVA solution is in the range of about 4:1 to about 8:1 and the concentration of PVA solution is about 1% to about 15% PVA by weight. For example, 0500/0250 and 0600/0250 or similar slurries may be used in some embodiments to create the coating 112. The representation xxxx/yyyy indicates the slurry parameters, where xxxx=weight ratio of powdered alloy to polyvinyl alcohol and yyyy=weight percent of polyvinyl alcohol present in the aqueous solution as a binder. A decimal point is implicit after the first two digits in the representation. Thus, 0500 represents 5.0. Thick slurry compositions, a high ratio of alloy to PVA solution, may be applied as a squeezable paste, or can be rolled into tapes for bonding to the tooth body 102. For some embodiments, the ratio of alloy to PVA solution may be in the range of about 8:1 to about 15:1 by weight and the concentration of PVA solution may be about 2% to about 15% PVA by weight. In the above procedures, additives can function as dispersants, suspending agents, and plasticizers.

The dried slurry may then be metallurgical bonded to the tooth body 102 to create the coating 112. In some embodiments, the tooth body 102 with the layer of fusible, hard metal alloy in the polyvinyl alcohol matrix or with the aqueous polyvinyl alcohol solution with the layer of fusible, can be heated to the fusing temperature of the hard metal alloy under a protective atmosphere until the hard metal alloy has fused onto the tooth body 102 in forming coating 112. Heating may occur in a controlled atmosphere, in some embodiments, in an inert or reducing atmosphere, excluding nitrogen which may nitride the coating 112. In some embodiments, after metallurgically bonding the coating 112 to the tooth body 102, remaining carburized metal of the tooth body 102 can be hardened to a desired hardness by quenching.

Figure 8:
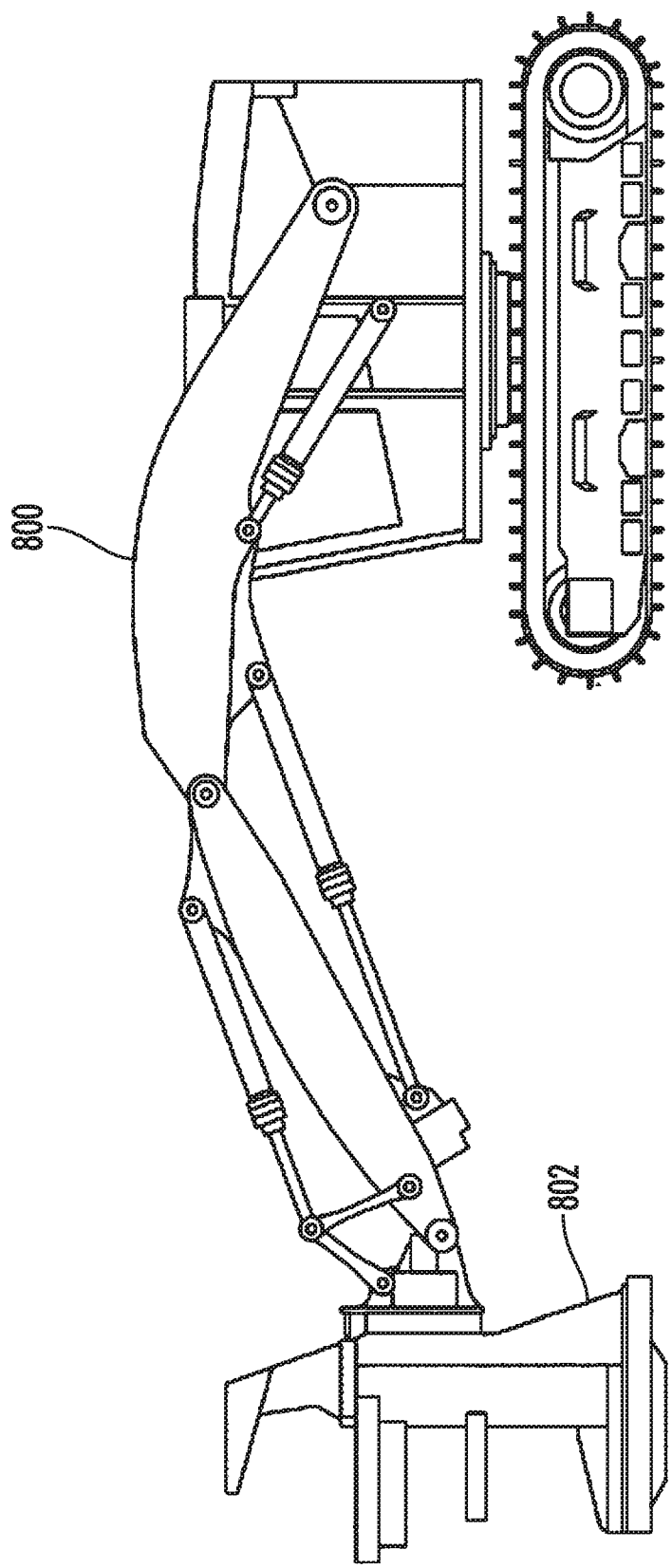
FIG. 8 is a side view illustration of a felling apparatus with felling head which may utilize the cutting teeth disclosed herein.

In some embodiments the coating 112 may be applied via thermal spraying to the tooth body 102. Thermal spraying includes the use of a heat source to melt a powdered or wire-form material into small droplets which may then be sprayed onto the tooth body 102. In some embodiments, laser cladding may be used for applying the coating 112 to the tooth body 102. Such process includes the used of powdered material fed into a laser beam as such is moved across tooth body 102. The powdered material melts onto tooth body 102 and forms the coating 112. Furthermore, in some embodiments, plasma transferred arc welding may be used for obtaining the coating 112 on the tooth body 102. For plasma transferred arc welding, a high-density plasma arc is used to metallurgically bond powdered or wire-form material to the tooth body 102 in forming the coating 112. Referring now to FIG. 8 there is a felling apparatus indicated by numeral 800. Felling apparatus 800 is understood to be a feller buncher for harvesting trees and other wood vegetation. Generally, a typical tree feller buncher first cuts the tree and then places the tree in bunches on the ground for further processing with other machines. Felling apparatus 800 includes felling head 802 which includes a cutting device for cutting the trees. Generally, such cutting device of felling head 802 includes cutting implement 402 which may be a circular saw. On cutting implement 402 the various embodiments of cutting teeth 100 of this disclosure may be incorporated to provide both felling head 802 as well as felling apparatus 800 the advantages of the disclosed cutting teeth.

Thus it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A cutting tooth, comprising:
    a tooth body having a mounting side, a front face spaced from the mounting side, and a plurality of lateral faces extending between the mounting side and the front face, the tooth body having an interior hardness;
    a coating applied to at least one of the lateral faces to form a lateral hardface, the lateral hardface having a hardface hardness greater than the interior hardness, an edge of the lateral hardface closest to the front face and a portion of the front face adjacent the edge of the lateral hardface defining a cutting edge region of the cutting tooth, the cutting edge region being self-sharpening due to faster wear of the front face than of the lateral hardface due to a difference in hardness between the lateral hardface and the front face; and
    at least a portion of an outer surface of the tooth body hardened to form a hardened outer body layer having an outer body layer hardness greater than the interior hardness and less than the hardface hardness.

2. The cutting tooth of claim 1, wherein:
    the interior hardness is in a range from about 25 to about 35 Rockwell C;

the outer body layer hardness is in a range of from about 58 to about 64 Rockwell C; and the hardface hardness is at least about 65 Rockwell C.

3. The cutting tooth of claim 1, wherein:

the hardened portion of the tooth body includes the front face so that in an unworn state of the tooth the front face includes the hardened outer body layer so that the cutting edge region of the tooth presents in a cutting direction the edge of the lateral hardface adjacent the hardened outer body layer of the front face.

4. The cutting tooth of claim 3, wherein:

in a worn state of the tooth the hardened outer body layer is worn away from the front face so that the cutting edge region presents in the cutting direction the edge of the lateral hardface adjacent a worn front face having the interior hardness.

5. The cutting tooth of claim 1, wherein:

the hardened portion of the tooth body includes the at least one lateral face on which the lateral hardface is formed, such that a cross-section of the tooth through the lateral hardface transitions from the hardface hardness to the outer body layer hardness to the interior hardness.

6. The cutting tooth of claim 1, wherein:

the front face faces in a cutting direction; and the lateral hardface extends in a direction no greater than 30 degrees offset from the cutting direction.

7. The cutting tooth of claim 1, wherein:

the coating is applied to at least two of the lateral faces to form two or more lateral hardfaces, so that a worn tooth can be removed from a cutting implement and rotated about a central axis of the cutting tooth to remount the cutting tooth on the cutting implement.

8. The cutting tooth of claim 7, wherein:

the two lateral hardfaces are on opposite sides of the tooth body, so that the worn tooth can be rotated 180 degrees about the axis to remount the cutting tooth.

9. The cutting tooth of claim 1, wherein:

in an unworn state of the tooth the front face is concave such that the at least one lateral face extends forward beyond a central portion of the front face; and the hardface extends forward beyond the central portion of the front face.

10. The cutting tooth of claim 1, wherein:

the coating has a thickness in a range of from about 0.25 mm to about 3 mm.

11. The cutting tooth of claim 1, wherein:

the coating comprises an iron-based alloy including at least 60 weight percent of iron, cobalt, or nickel.

12. The cutting tooth of claim 1, wherein:

the coating comprises an alloy consisting essentially of one or more elements selected from iron, nickel, and cobalt, and two or more elements selected from boron, carbon, chromium, molybdenum, manganese, tungsten, and silicon.

13. The cutting tooth of claim 1, wherein:

the coating is metallurgically bonded to the tooth body.

* * * * *